INVENTOR.
ROBERT N. STRAEHL

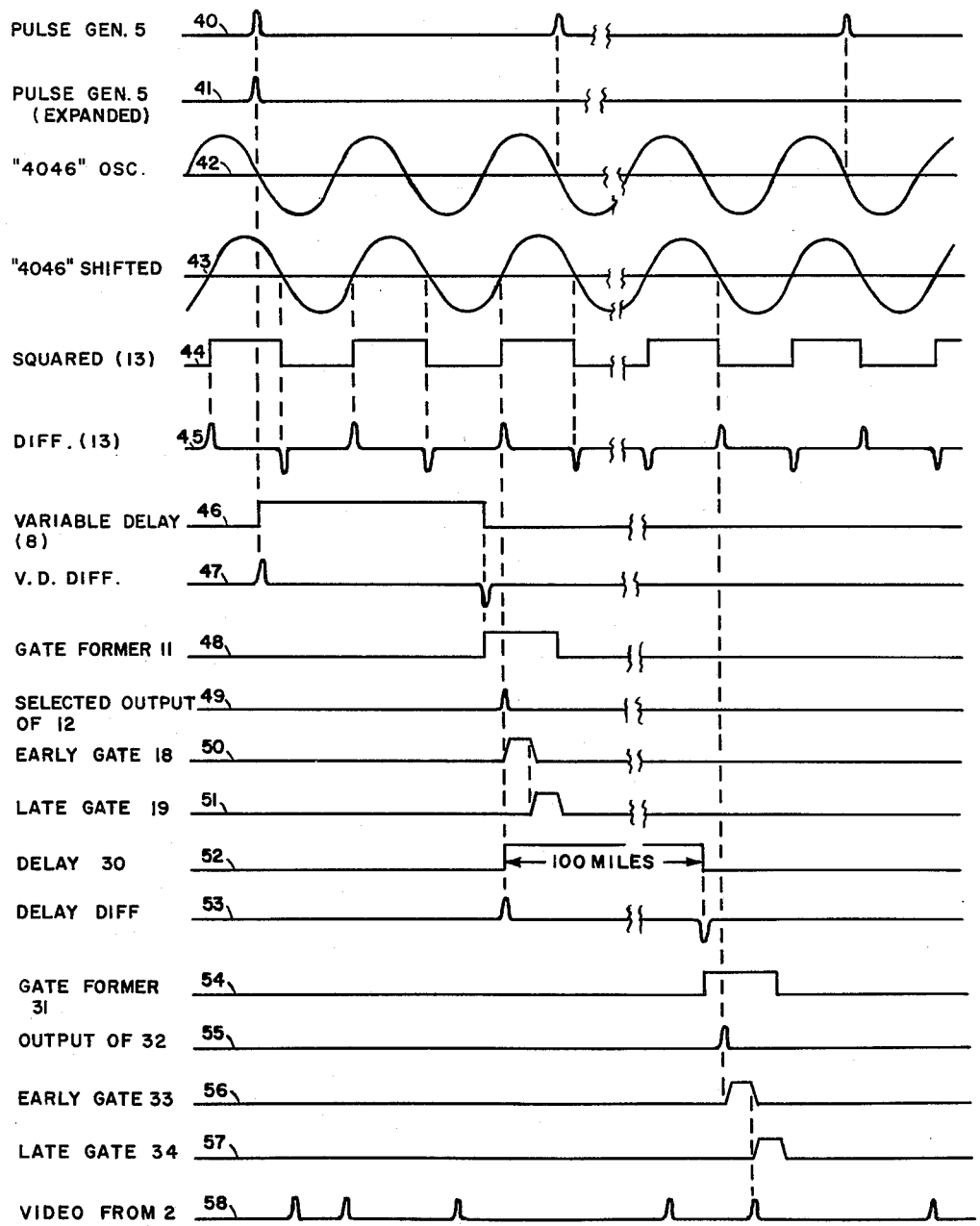

3,051,946
RANGE MEASURING METHOD
Robert N. Straehl, Pittsford, N.Y., assignor to General Dynamics Corporation, Rochester, N.Y., a corporation of Delaware
Filed May 9, 1958, Ser. No. 734,349
4 Claims. (Cl. 343—7.3)

This invention relates to distance measuring radio circuits and is particularly directed to means for speeding the establishment of the radio link between an interrogating mobile station and its reference ground station. This invention, more specifically, is directed to shortening the search "phase" preceding the "lock-on" phase of range measurement.

In radar-type navigating equipment, or in so-called tactical air navigating systems commonly known as Tacan, the transit or travel time of a radio wave between two points is translated into distance. In radar, a powerful pulse of microwave energy is transmitted to a prominent reflecting object, the echo pulse is received back at the starting point, and the elapsed time between the instant of transmission and reception is a measure of distance. For all practical purposes, the velocity of radio waves in air is constant.

In Tacan systems, which will hereinafter be referred to in detail, an "interrogating" pulse is radiated omnidirectionally, usually from a mobile station, and is received at a fixed station called a "transponder" from which is retransmitted a reply after a fixed system time delay of, say, 50 microseconds. When received at the initiating point the transit time may be computed as in the case of conventional pulse radar. It will now be perceived that the echo or reply pulse must not be confused with random noise pulses nor with the reply pulses to other interrogators. In Tacan, the receiver must be rendered inoperative except only during a short interval of time when the reply pulse is expected, to exclude unwanted pulses. During this short interval, the receiver is said to be "gated-on."

It follows that if the range is unknown, the time for gating is unknown and the time interval from the instant of transmission of the interrogating pulse to the instant of gating must be varied slowly in "search" for the reply pulse. After a reply has been found which repeats at a given range so as to identify itself, search is stopped and "lock-on" and "tracking" is started. The shift from "search" to "tracking" phase in conventional Tacan systems is described in detail in the prior art, one recommended publication being the "Handbook and Service Instructions for Radio Set AN/ARN-21" published by the Secretary of the Air Force or the Bureau of Aeronautics, dated May 1, 1956.

The presence of random noise pulses plus many asynchronous replies to other aircraft or interrogating stations may accompany the desired replies. This leads to the limitation that a relatively narrow gate pulse must be used to inspect the time scale following an interrogation, since a relatively wide gate would be more likely to admit the correct number of random pulses which would destroy the equipment's ability to distinguish uniqueness among the synchronized replies. It now becomes apparent that there is a need for a gate pulse with a limited width and that there must be a limit on the rate with which the gate is moved in search for the correct time. If a fixed average pulse repetition frequency for interrogation is required, and if the gate searching speed is arbitrarily increased, the number of replies occurring during the time of the gate passing the correct time will decrease. But, for a given amount of redundancy to verify the presence of a true state of synchronism, no decrease in redundancy can be tolerated. Hence, there appears to be a fixed search speed and, therefore, a fixed "search time" required for a given system design and a given amount of system reliability. This "search time" in normal Tacan is about twenty seconds maximum, about seven reply pulses being required to occur while the gate passes a given value of elapsed time.

The object of this invention is to provide an improved distance measuring system.

A more specific object of this invention is to provide in a distance measuring circuit means for increasing the speed of searching for correct range.

The objects of this invention are obtained in a distance measuring system including means for transmitting interrogating pulses and means for receiving reply pulses characterized in the search phase in this that a plurality of gate pulses are separated by a constant or variable period of time and are generated for each interrogation, said gate pulses being progressively shifted in time throughout the search phase and then changing to the tracking phase when any one of the gates occur at the proper range.

Other objects and features of this invention will occur to those skilled in the art after referring to the specific embodiments in the following specification and shown in the accompanying drawings, in which:

FIG. 2 is a time scale diagram showing the time relationships of principal voltages in the system of FIG. 1.

Figure 1:
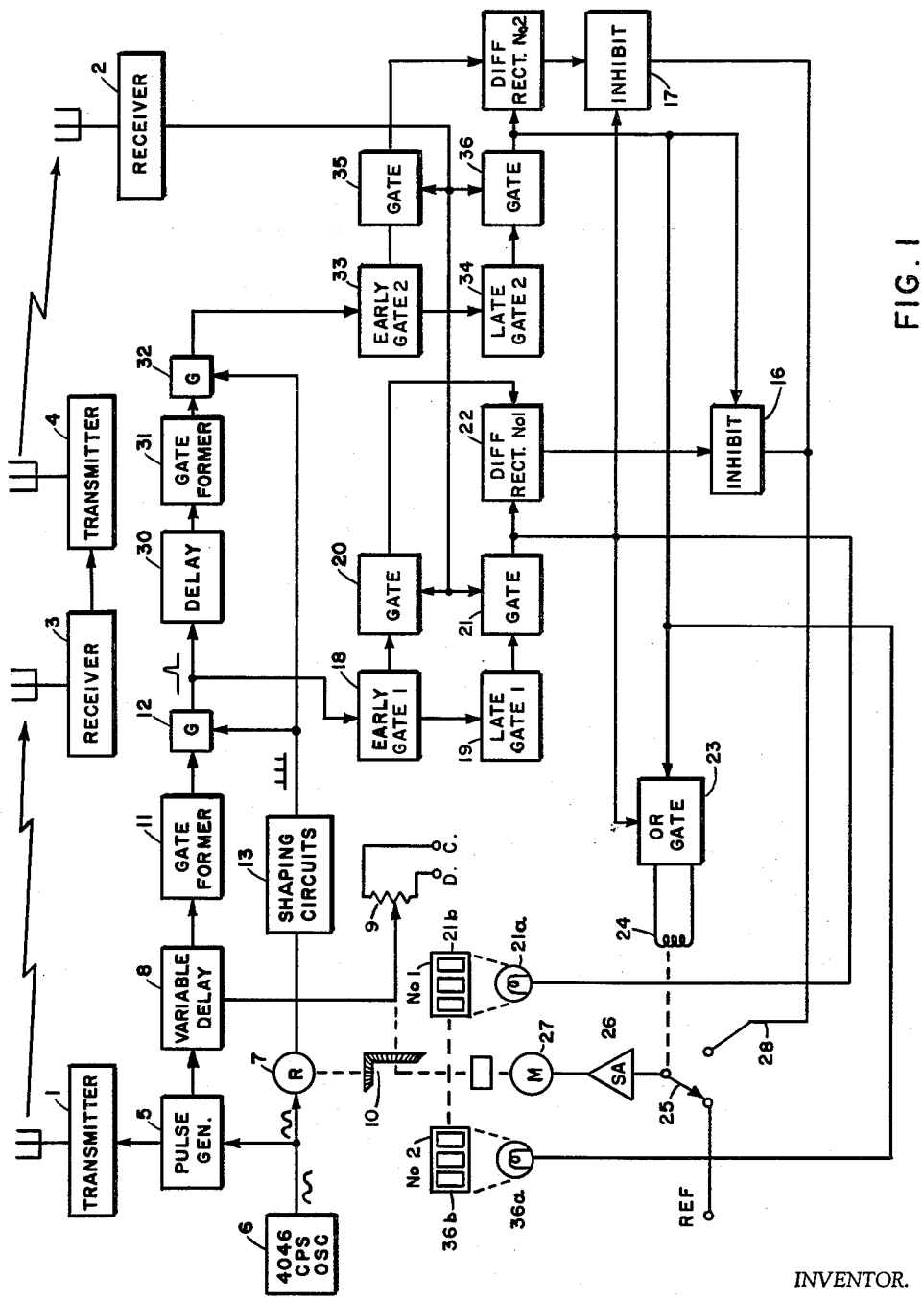
FIG. 1 is a block diagram of a Tacan-type system embodying this invention.

In FIG. 1 the transmitter 1 is adapted to transmit code pulses of radio-frequency energy and receiver 2 at the same station is adapted to receive replies of those coded pulses. The antennae of transmitter 1 and receiver 2 may be structurally the same equipment. The antennae would be omnidirectional in the case of the Tacan equipment here shown, and would be directional in the case of radar-type distance measuring equipment. It is assumed here that the transmitter-receiver 1—2 is mobile and is carried by aircraft, say, which must establish its own position with respect to a fixed base. At a fixed base, either on land or aboard ship, is provided the receiver 3 responsive to the transmitter 1 signals, and the cooperating transmitter 4 for transmitting replies to the received signals.

The carrier of transmitter 1, FIG. 1, is modulated by the pulse generator 5. Generator 6 generates a well-controlled frequency reference signal from which the precise measurements of elapsed time are derived. The pulse generator 5, however, is unstable and is synchronized with random submultiples of the signal of generator 6 so that although the number of cycles will vary between successive pulses a precise relationship is preserved between the pulses and the phase of the particular wave at the time of a pulse transmission. The complete randomness of the frequency of generator 5 insures the necessary lack of similarity of transmitted pulse signals from the many transmitters (1) that may be tuned to one ground station 3—4. While the frequency of generator 6 may be of any value, a frequency of 4046 cycles per second has certain operating advantages inasmuch as this frequency corresponds to the round-trip travel time of Tacan radio waves over a twenty mile course. For convenience, 4046 will be referred to below.

Concurrently with this synchronizing action, the 4046 signal is phase-shifted in a resolver-phase shifting network 7. Pulses from the pulse generator also trigger a multivibrator-type variable delay circuit 8, such as a phantastron. Triggering of the delay circuit is accompanied by the initiation of a radio frequency pulse from transmitter 1. The characteristic desired here for the delay circuit is that the length of the delay is varied under the control of a direct current voltage supplied by the potentiometer 9. The wiper of the potentiometer 9 is moved by the same servo motor that turns the resolver shaft, but is geared down by a factor of 5:1. Pinions 10, for example, would be chosen to rotate the resolver five times for each revolution of the potentiometer wiper. Hence, while the potentiometer moves through its entire range corresponding to one hundred miles, the resolver is turned through five revolutions, each of which represents 360 degrees of phase of the 4046 cycles per second signal and which corresponds to twenty miles per cycle. Thus, as the 4046 signal is continuously shifted in phase, the trailing edge of the phantastron pulse moves out in time to keep in step with a particular cycle of the wave train.

The gate pulse former 11 is triggered by the trailing edge of the phantastron pulse, and the resulting gating pulse forms one input to the coincidence gate circuit 12. The other input to the gate 12 are pips resulting from pulse shaping the phase shifted 4046 sine wave from generator 6. The wave shaping is done at 13. A single pulse per interrogation at the output of gate 12 is selected from the continuous train of pulses entering the gate by the action of the other input gating pulse from the gate pulse former 11. The output of gate 12 moves in time from the interrogation pulse at a nominally constant rate called the "searching" rate. This "movable" pulse from gate 12 triggers an early gate pulse former 18, and then triggers at a later time, the late gate pulse former 19 whose pulses move in time over the zero to one hundred mile range, in the example chosen for discussion. The two gates, 20 and 21, are fed with video information from the Tacan receiver circuitry in addition to the adjacent early and late gate pulses. Coincidence in 20 or 21 of the gate pulses with any video signal causes an output to appear and this output signal enters the differential rectifier circuit 22. A conventional integrating circuit is incorporated in the differential rectifier circuit so that only those pulses which repeat regularly and at a sufficiently high pulse repetition rate will register. Thus, occasional noise pulses including synchronized squitter and replies to other aircraft are excluded. In the process of moving outward in range, that is, increasing, the first gate pulse to "see" or coincide with a repetitive reply pulse will be the late gate. If the true distance is less than one hundred miles, late gate 19 will produce output when the correct delay has been introduced by the phantastron delay circuit 8. This output will pass through the OR gate 23 to operate the search-track relay 24 which in turn operates switch 25. Switch 25 is in the input of servo amplifier 26 and switches the amplifier from a fixed reference voltage, which drives the servo motor 27 at a fixed maximum speed, to an error voltage on lead 28 whose magnitude and polarity are representative of the timing error magnitude and direction, respectively, of the search gates. If this repetitive reply pulse lies wholly within the late gate, as will necessarily be the case where first sensing the reply, the output of differential rectifier 22 will be unbalanced and in such a direction as to cause the servo to advance the gate position to a greater value of delay. As this process takes place, a point will be reached where both early and late gates are partially coincident with the replies and the replies will "straddle" the gates. When a condition of perfect balance is arrived at, the differential rectifier 22 output will drop to zero and the servo motor will slow to a halt. Output from the late gate 21 will light the scale illuminator lamp 21a on scale 21b from which a reading of distance can be made. Specific details of conventional circuitry for operating the early-late gates 20, 21 upon receipt of a video signal is well understood by those skilled in the art and is employed in the airborne Tacan transmitter-receiver commonly known as the ARN-21, described in the Handbook, supra.

The output of gate 12 is also fed to the delay element 30 where the equivalent of one hundred miles of delay is introduced. This is approximately 1230 microseconds.

The delayed pulse triggers the gate pulse former 31 whose output pulse inspects a segment in time 1230 microseconds later than the first gate pulse former 11 and selects in gate 32 one of the 4046 c.p.s. pips. A second group of early and late gate pulse formers 33, 34 and gates 35, 36 then inspects the video as before, but here in the 100–200 mile region rather than in the 0–100 mile region. The late gate 34, 36 also operates the OR gate 23 as before and through the relay 24 shifts the servo amplifier from its reference driving voltage to the early-late gate servo control. Distance in miles is read on register scale 36b in the 100–200 mile when illuminated by lamp 36a.

Although the search-track relay 24 can be operated by late gate outputs from either the 0–100 or 100–200 mile circuits, by means of the "inhibit" gates 16 and 17, output from one gate eliminates output from the other differential rectifier circuit, thus allowing servo amplifier error signals to originate in but a single source.

The operation of the Tacan system of FIG. 1 can best be summarized by referring to the waveforms of FIG. 2 in which the time axes 41–58, inclusive, of the various waveforms are identical. The time base of axis 40, however, has been compressed to show several of the random pulses at the output of generator 5, one such pulse only appearing on the expanded base 41. The sinusoidal output of generator 6 appears on axis 42, the nodal point thereof being in phase with the pulse of generator 5. On line 43 the same wave is shown after it has been shifted in phase by the resolver 7, while on line 44 the same wave has been squared by amplification and limiting in the shaping circuits of 13. The two sides of the square pulses are differentiated in conventional manner to produce the positive and negative spikes shown on axis 45. The output of the delay circuit 8 triggered by pulse generator 5 is shown on axis 46, the output thereof being differentiated as shown on axis 47. The pip at the trailing edge of the variable delay output triggers the gate former circuit of 11 as shown on axis 48. On axis 49 appears the particular spike selected by the gate 12 from among the many spikes in the output of shaping circuit 13, this spike initiating operation of the early gate 18 and late gate 19, as shown on axes 50 and 51, respectively. Should a video signal (axis 58) appear during either early or late gate, it produces an output from the differential rectifier 22, as explained above.

The selected pulse at the output of gate 12 is also applied to the delay network 30 (axis 52) which produces a delay in time corresponding to the transient time of a radio wave over a course of, say, one hundred miles. The output of the delay network is differentiated (axis 53) and the trailing edge thereof is applied to gate former 31 (axis 54). Gate former 31 is in all important respects the same as gate former 11 and passes the spike from the shaping circuit 13 (axis 55) to initiate operation of early gate 33 and late gate 34 (axes 56 and 57, respectively). In the example diagrammed, a video pulse is shown to occur in time intermediate the second pair of early and late gates which, as explained, serves to operate the search-track relay 24 and to slow the motor 27 to a stop or to tracking speed.

Many modifications may be made in the specific circuits shown in FIG. 1 without departing from the scope of this invention. For example, a third or even a fourth pair of early-late gates may be added to FIG. 1 along with successive delays corresponding to the delay of circuit 30 to divide the search time into three or four parts. Further, the search gates could, if desired, be controlled by a delay device 30 so that the two ranges are scanned in opposite directions or at different speeds. A second phantastron, similar to 8, would be driven by a second potentiometer 9 and the scanning speeds and phases of scanning cycles varied at will.

What is claimed is:

1. In combination in a system of the class described, means for transmitting a series of interrogating pulses, a plurality of pairs of early and late gates for admitting only reply pulses, means for opening each gate pair after the transmission of each interrogating pulse including means for delaying the opening of the pairs of gates unequal periods of time after the transmission of each interrogating pulse, means for progressively changing the delay period, and means for passing a reply pulse through the first pairs of gates to coincide in opening time with the reply pulse.

2. In combination in a range searching and tracking system of the class described comprising means for transmitting interrogating radio pulse signals over the course to be measured and means for receiving back reply pulses, a plurality of pairs of early and late gating circuits, means for simultaneously applying the received reply pulses to all of the gating circuits, and means for successively applying a locally generated timing pulse to each of the pairs of gating circuits; and means to identify the gating circuit in which coincidence occurs in the application of said received pulses and said timing pulses.

3. The identifying means of the combination defined in claim 2 comprising an inhibiting circuit responsive to the gating circuit in which said coincidence occurs, to render inoperative the remainder of said gating circuits.

4. A radio ranging system comprising two pairs of early and late gate means, a source of video signals applied in parallel to said two pairs of gate means, a source of gate-controlling pulses synchronized with said video signals, means for progressively shifting the phase position of said gate-controlling pulses with respect to said video signals, a delay circuit, one of said pairs of gate means being coupled directly to said source of gate-controlling pulses, the other of said pairs of gate means being coupled through said delay circuit to said source of gate-controlling pulses.

References Cited in the file of this patent

UNITED STATES PATENTS

| | | |
|---|---|---|
| 2,569,485 | McLennan | Oct. 2, 1951 |
| 2,717,999 | Lewinstein | Sept. 13, 1955 |
| 2,746,032 | Moore | May 15, 1956 |
| 2,776,423 | Richardson | Jan. 1, 1957 |
| 2,815,504 | Clark | Dec. 3, 1957 |
| 2,857,592 | Hoffman | Oct. 21, 1958 |